United States Patent
Ommundson et al.

(10) Patent No.: US 6,439,772 B1
(45) Date of Patent: Aug. 27, 2002

(54) METHOD AND APPARATUS FOR SUPPORTING ROTOR ASSEMBLY BEARINGS

(75) Inventors: Peter Carl Ommundson, North Andover; Robert Burton Brown, Medford; Scott Albert Tardanico, Littleton, all of MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/728,796

(22) Filed: Dec. 1, 2000

(51) Int. Cl.$^7$ .............................................. F16C 27/00
(52) U.S. Cl. ......................... 384/99; 60/223; 416/174; 415/229; 29/889.2
(58) Field of Search .......................... 384/99, 103, 535, 384/581, 490, 462; 416/2, 174, 204 A, 170 R; 60/223, 226.1, 39.01, 39.091; 188/378; 267/136; 415/9, 210.1, 229, 119; 248/562, 636

(56) References Cited

U.S. PATENT DOCUMENTS

| | | | |
|---|---|---|---|
| 3,756,672 A | * 9/1973 | Hibner et al. .................. 384/99 |
| 3,910,651 A | * 10/1975 | Pearce et al. | |
| 4,084,861 A | * 4/1978 | Greenberg et al. | |
| 4,289,360 A | * 9/1981 | Zirih | |
| 4,313,712 A | 2/1982 | Briggs | |
| 4,375,906 A | 3/1983 | Roberts et al. | |
| 4,453,890 A | 6/1984 | Brantley | |
| 4,456,425 A | * 6/1984 | McCarty et al. | |
| 4,827,712 A | 5/1989 | Coplin | |
| 4,973,221 A | * 11/1990 | Anderson et al. ............ 415/119 |
| 5,067,825 A | * 11/1991 | Vance et al. ................... 384/99 |
| 5,219,144 A | * 6/1993 | Fox et al. ....................... 384/99 |
| 5,316,391 A | * 5/1994 | Monzel ......................... 384/99 |
| 5,344,239 A | * 9/1994 | Stallone et al. | |
| 5,433,584 A | 7/1995 | Amin | |
| 5,974,782 A | 11/1999 | Gerez | |
| 6,002,778 A | 12/1999 | Rossetti et al. | |
| 6,073,439 A | 6/2000 | Beaven et al. | |
| 6,098,399 A | 8/2000 | Richards et al. | |
| 6,109,022 A | 8/2000 | Allen et al. | |
| 6,135,639 A | * 10/2000 | Dede ............................ 384/99 |
| 6,240,719 B1 | 6/2001 | Vondrell et al. | |
| 6,331,078 B1 | * 12/2001 | Van Duyn | |

FOREIGN PATENT DOCUMENTS

GB  2 192 233 A  1/1988

* cited by examiner

*Primary Examiner*—Douglas C. Butler
(74) *Attorney, Agent, or Firm*—Nathan D. Herkamp; Armstrong Teasdale LLP

(57) ABSTRACT

A rotor assembly for a gas turbine engine including a bearing assembly and a damper sub-assembly that facilitate reducing dynamic motion to the rotor assembly is described. The bearing assembly includes rolling elements positioned between a paired race. The rotor assembly includes a rotor shaft supported by the bearing assembly. The damper sub-assembly is radially outward from the bearing assembly adjacent a sump housing, and includes a damper insert. A predetermined preload force is applied to the rolling elements. An outer race of the bearing assembly distorts to substantially match a distortion pattern of the damper insert.

20 Claims, 4 Drawing Sheets

METHOD AND APPARATUS FOR SUPPORTING ROTOR ASSEMBLY BEARINGS

BACKGROUND OF THE INVENTION

This application relates generally to gas turbine engine rotor assemblies and, more particularly, to bearing assemblies for gas turbine engine rotor assemblies.

Gas turbine engines typically include a fan rotor assembly, a compressor, and a turbine. The fan rotor assembly includes a fan that includes an array of fan blades extending radially outward from a rotor shaft. The rotor shaft transfers power and rotary motion from the turbine to the compressor and the fan, and is supported longitudinally with a plurality of bearing assemblies. Bearing assemblies support the rotor shaft and typically include rolling elements positioned within an inner race and an outer race. The outer race is radially inward from a sump housing.

As the rotor is accelerated, non-synchronous vibration may develop within the rotor assembly and be induced to the bearing assemblies. Continued exposure to vibrational forces may result in premature failure of the bearing assembly. To minimize potential detrimental effects associated with such vibrations, at least some known gas turbine engines include a damper assembly adjacent the bearing assemblies to control rotor motion associated with non-synchronous vibration. The damper assembly is positioned such that a radial clearance is defined between the bearing assembly outer race and the damper assembly to facilitate minimizing vibrational forces being induced from the bearing assembly into the mounting frame. Because the clearance is typically pre-set based on geometric tolerances and thermal growth considerations, partial part distortions may affect the damper clearance and may result in rotor motion that is not damped.

BRIEF SUMMARY OF THE INVENTION

In an exemplary embodiment, a rotor assembly for a gas turbine engine includes a bearing assembly and a damper sub-assembly that facilitates reducing dynamic motion of the rotor assembly. The bearing assembly includes a plurality of rolling elements positioned between an inner and an outer race, and a plurality of springs that couple the bearing assembly to a sump housing. The sump housing extends between a damper insert and a combustor casing. The rotor assembly includes a rotor shaft supported by the bearing assembly and rotatably coupled to the bearing assembly inner race. The damper sub-assembly includes the damper insert which is coupled within the engine radially outward from the bearing assembly.

During operation, as the rotor shaft rotates, the sump housing distorts causing the damper insert to distort against the sump housing. The damper sub-assembly facilitates reducing dynamic motion of the rotor assembly. Specifically, the outer race deflects to substantially match a distortion pattern of the damper insert distorting against the sump housing, such that a variation in a clearance defined between the bearing assembly and the damper insert is facilitated to be reduced. More specifically, a portion of the bearing assembly outer race in contact with the roller elements deflects to match the distortion pattern of the damper insert. As a result, the bearing assembly and the damper sub-assembly facilitate reducing dynamic motion of the rotor assembly.

DETAILED DESCRIPTION OF THE INVENTION

Figure 1:
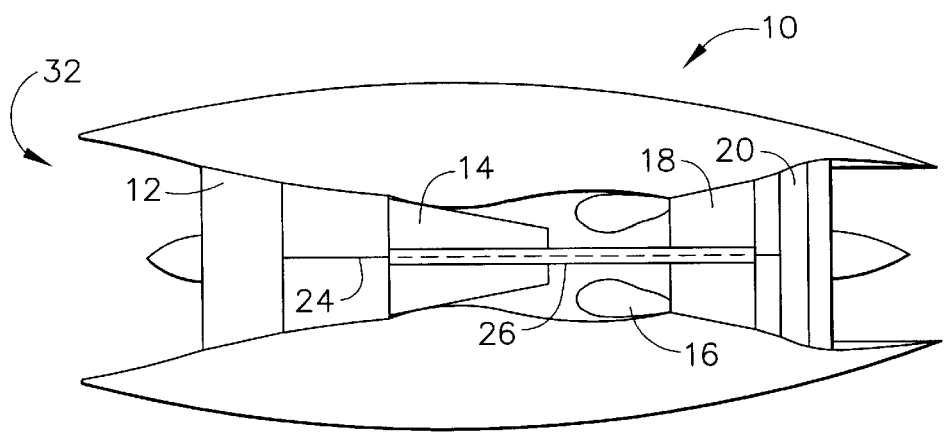
FIG. 1 is schematic illustration of a gas turbine engine.

FIG. 1 is a schematic illustration of a gas turbine engine 10 including a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, engine 10 is a CF34 engine commercially available from General Electric Company, Cincinnati, Ohio and Lynn, Mass.

In operation, air flows through low pressure compressor 12 from an upstream side 32 of engine 10 and compressed air is supplied from low pressure compressor 12 to high pressure compressor 14. Compressed air is then delivered to combustor assembly 16 where it is mixed with fuel and ignited. The combustion gases are channeled from combustor 16 to drive turbines 18 and 20.

Figure 2:
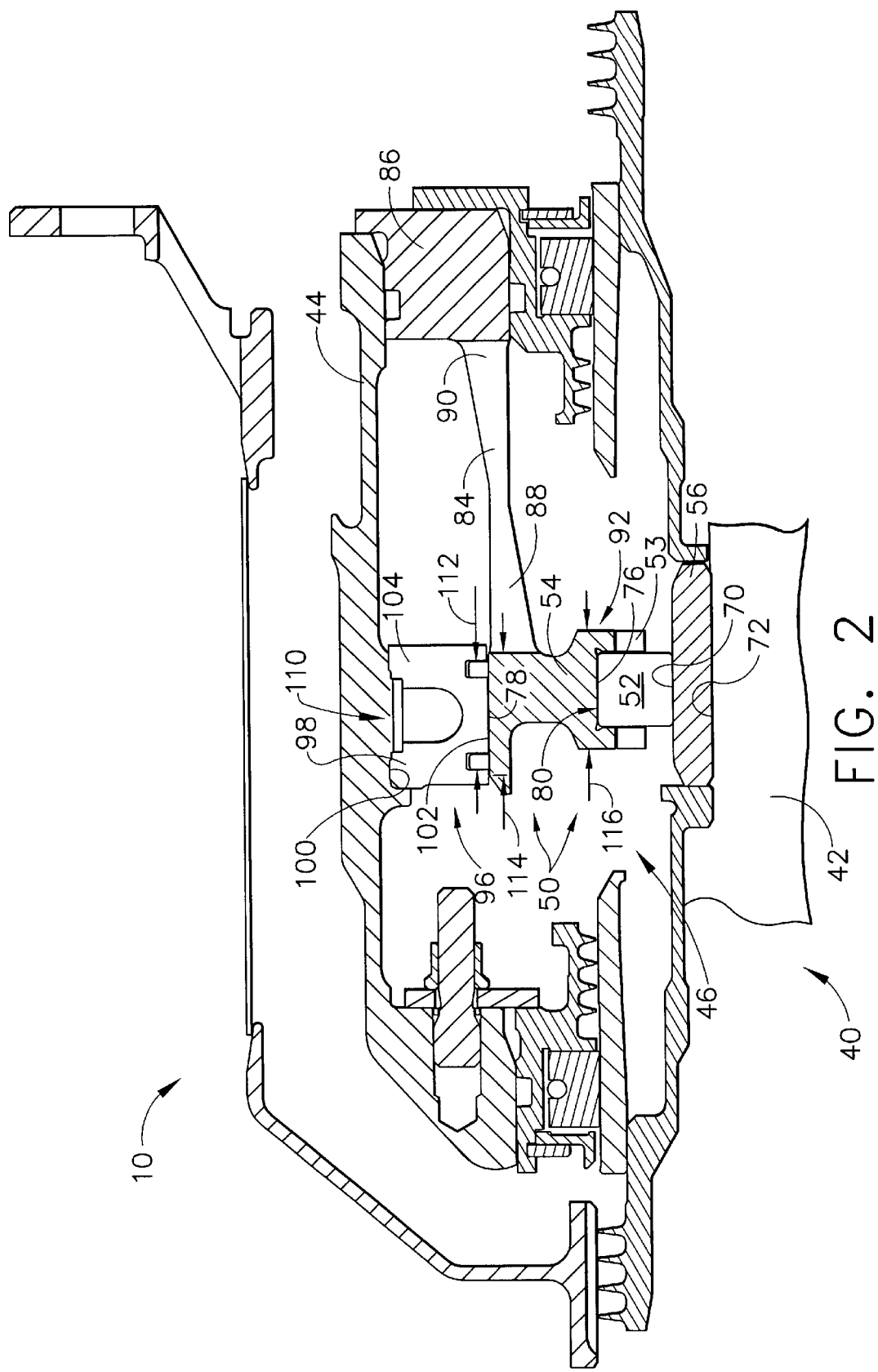
FIG. 2 is a cross-sectional view of an exemplary embodiment of a rotor assembly used in the gas turbine engine shown in FIG. 1 and including a bearing assembly.

FIG. 2 is a cross-sectional view of an exemplary embodiment of a rotor assembly 40 used with gas turbine engine 10 (shown in FIG. 1). Rotor assembly 40 includes a rotor shaft 42. In one embodiment, rotor shaft 42 is substantially similar to rotor shaft 26 (shown in FIG. 1). Rotor shaft 42 is rotatably coupled to a sump housing 44 with a bearing assembly 46 that supports rotor shaft 42. In one embodiment, bearing assembly 46 is known as an engine number four bearing assembly.

In an exemplary embodiment, bearing assembly 46 includes a paired race 50, a plurality of rolling elements 52, and a cage 53. More specifically, paired race 50 includes an outer race 54 and an inner race 56 radially inward from outer race 54. In one embodiment, bearing assembly 46 includes thirty rolling elements 52. Each rolling element 52 is between inner race 56 and outer race 54, and in rolling contact with inner and outer races 56 and 54, respectively. Furthermore, rolling elements 52 are spaced circumferentially by cage 53.

Inner race 56 includes an outer diameter 70 and an inner diameter 72. Inner race outer diameter 70 receives each rolling element 52 in rollable contact. Inner race 56 is secured adjacent rotor shaft 42 such that inner race inner diameter 72 is adjacent rotor shaft 42.

Bearing outer race 54 is annular and includes an inner diameter 76 and an outer diameter 78. Bearing outer race inner diameter 76 includes a recess 80 that receives rolling elements 52 in rollable contact. Bearing assembly 46 is secured in position relative to engine 10 with a plurality of springs 84 extending between a mounting flange 86 and bearing outer race 54. In one embodiment, springs 84 are double-tapered beams that extend circumferentially in a row around rotor shaft 42. Each spring 84 includes a forward end 88 and an aft end 90. Each spring forward end 88 extends from bearing outer race 54, and each spring aft end 90 extends from mounting flange 86. More specifically, each spring forward end 88 extends from a downstream side 92 of bearing outer race 54.

A damper sub-assembly 96 is coupled within engine 10 radially outward from bearing outer race 54 to limit radial motion of bearing assembly 46. Damper sub-assembly 96 includes an annular damper insert 98. Damper insert 98 includes an outer diameter 100, an inner diameter 102 and a body 104 extending there between. Damper insert 98 is coupled within engine 10, such that damper insert inner diameter 102 is adjacent bearing outer race outer diameter 78, and damper insert outer diameter 100 is adjacent sump housing 44. More specifically, sump housing 44 includes an annular support flange 110 sized to receive damper insert outer diameter 100. Damper insert inner diameter 102 has a width 112 that is less than a width 114 of bearing outer race outer diameter 78. Bearing outer race 54 also has width 116 at bearing outer race inner diameter 76.

Damper insert 98 provides a distribution flow path for oil to enter an annulus formed between damper insert and bearing outer race 54. The oil functions as a damper within damper sub-assembly 96. More specifically, damper insert inner diameter 102 forms an outer surface of the damper, and bearing outer race outer diameter 78 forms an inner surface of the damper.

During assembly of rotor assembly 40, rotor shaft 42 is supported on sump housing 44 with bearing assembly 46. More specifically, rotor shaft 42 is rotatably coupled to sump housing 44 with bearing assembly 46. Each bearing assembly inner race 56 is positioned adjacent rotor shaft 42 and roller elements 52 are secured between races 54 and 56. More specifically, springs 84 control a radial spring rate of bearing outer race 54 to determine a level of rotor loads induced through bearing assembly 46. The controlled spring rate is variable and is selected based on a plurality of considerations including, but not limited to bearing loading, bearing life, rotor dynamics, and rotor deflection considerations.

During operation of engine 10, as rotor assembly 40 rotates, sump housing 44 distorts causing damper insert 98 to distort with sump housing 44. More specifically, damper insert inner diameter 102 distorts with sump housing 44. Specifically, bearing assembly outer race 54 deflects, as described below, to substantially match a distortion pattern of damper insert inner diameter 102, such that a clearance between bearing assembly outer race 54 and damper insert 98 is facilitated to be uniform. More specifically, bearing assembly outer race outer diameter 78 deflects to match the distortion pattern of damper insert inner diameter 102. Accordingly, clearance variation between damper sub-assembly 96 and bearing assembly 46 is reduced.

Figure 3:
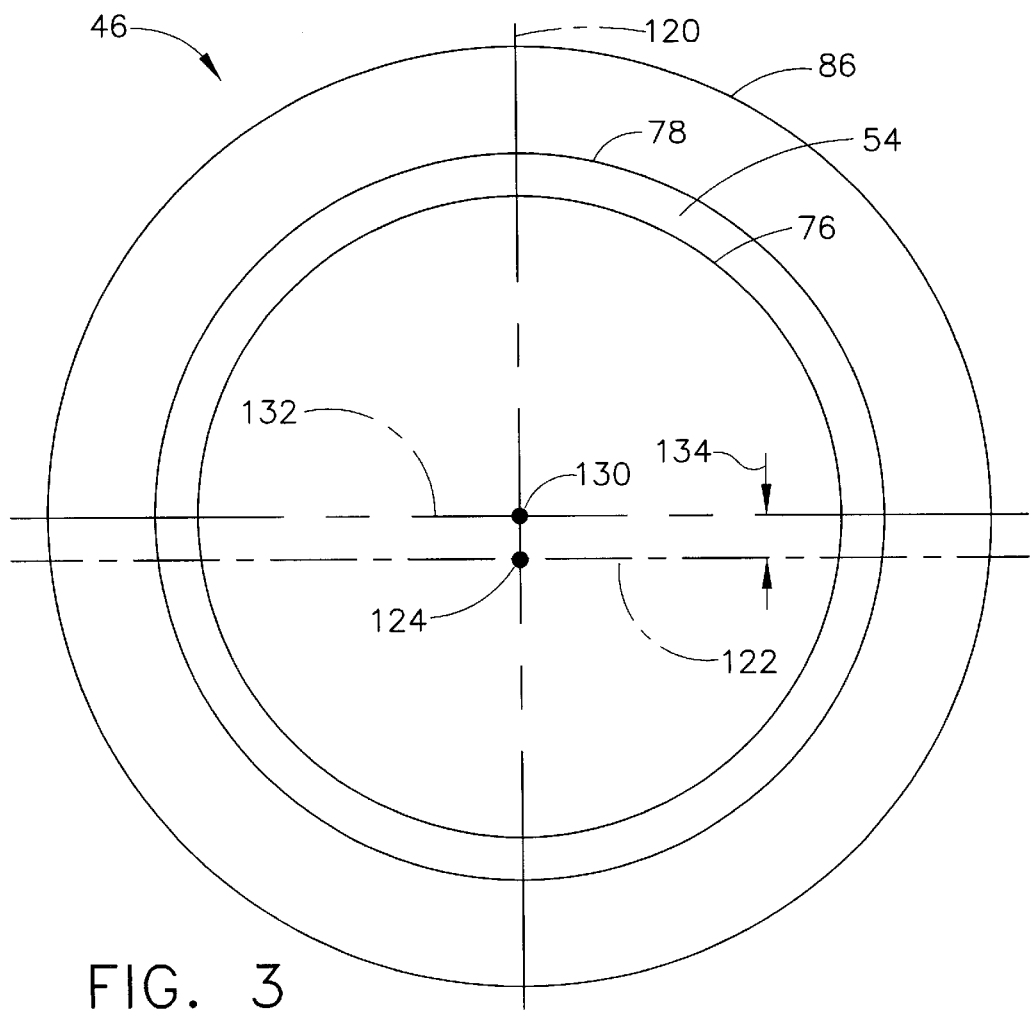
FIG. 3 is a partial end view of the bearing assembly shown in FIG. 2 illustrating an offset within the bearing assembly.

FIG. 3 is a partial end view of bearing assembly 46 illustrating an offset preset within bearing assembly 46. Sump housing 44 is annular and includes a first axis of symmetry 120 and a second plane of symmetry 122 that is substantially perpendicular to first axis of symmetry 120. First axis of symmetry 120 extends radially through engine 10 (shown in FIG. 1), and second plane of symmetry 122 extends axially through engine 10. A center 124 of sump housing 44 is defined at an intersection of axis of symmetry 120 and plane of symmetry 122. A center of engine 10 (shown in FIG. 1) is substantially concentric with center 124.

As seen in FIG. 3, bearing assembly outer race 54 defines a substantially circular profile and has a center 130. Each rolling element 52 has a substantially circular cross sectional profile, and when assembled, rolling elements 52 define a substantially circular cross-sectional profile. Bearing assembly center 130 is defined similarly to sump housing center 124, and is located on an axis of symmetry 132 of bearing outer race 54.

During assembly of rotor assembly 40, to facilitate bearing outer race 54 developing desired deflection, bearing outer race 54 is offset from sump housing 44. More specifically, bearing outer race 54 is mounted such that bearing outer race is offset a radial distance 134 outward from sump housing center 124. In one embodiment, bearing outer race center 130 is offset from sump housing center 124 a distance 134 that is approximately equal 0.001 inches.

Accordingly, during assembly, a weight of rotor 40 (shown in FIG. 2) causes bearing assembly 46 to be centered within damper sub-assembly 96. More specifically, the weight of rotor assembly 40 also forces bearing assembly 46 to be centered within damper insert 98, such that a center (not shown) of damper insert 98 is substantially concentric with bearing assembly center 130.

Figure 4:
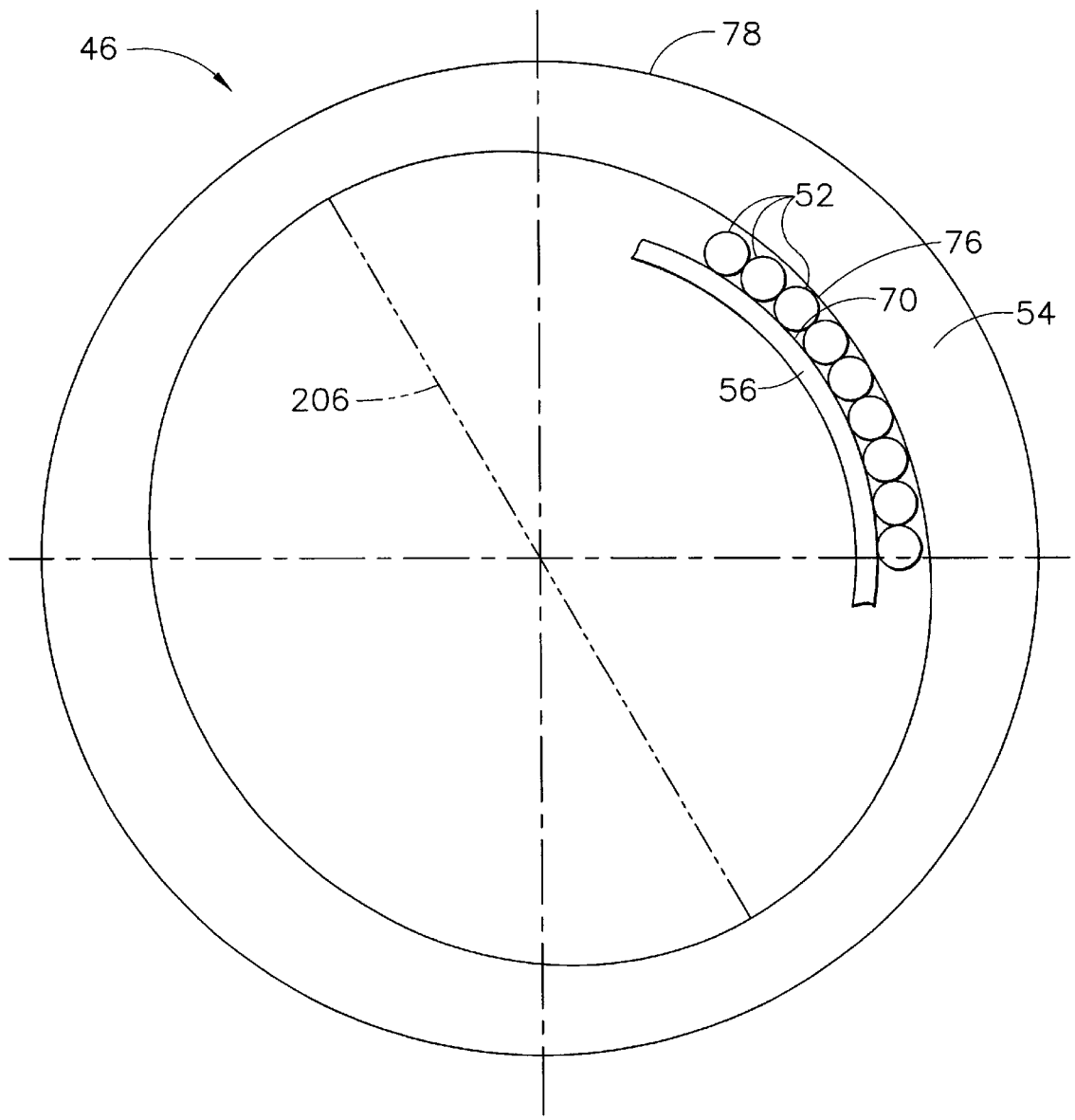
FIG. 4 is an alternative partial end view of the bearing assembly shown in FIG. 2 illustrating an elliptical profile within the bearing assembly.

FIG. 4 is an alternative partial end view of an alternative embodiment of a bearing assembly 46 illustrating an elliptical profile within bearing assembly 46. More specifically, bearing assembly outer race inner diameter 76 has a substantially elliptical cross-sectional profile. In one embodiment, bearing outer race inner diameter 76 is machined to define the elliptical profile. More specifically, the elliptical pattern defined includes a major axis 206 that is phased to match a distortion pattern of damper insert inner diameter 102 (shown in FIG. 2).

Accordingly, because bearing assembly outer race inner diameter 76 defines a substantially round cross-sectional profile, as rotor assembly 40 (shown in FIGS. 2 and 3) increases rotational speed, an operating temperature of bearing assembly 46 also increases. As a result, an amount of desired deflection of outer race outer diameter 78 is obtained, thus facilitating reducing damper clearance variations and improving effectiveness of the damper.

Figure 5:
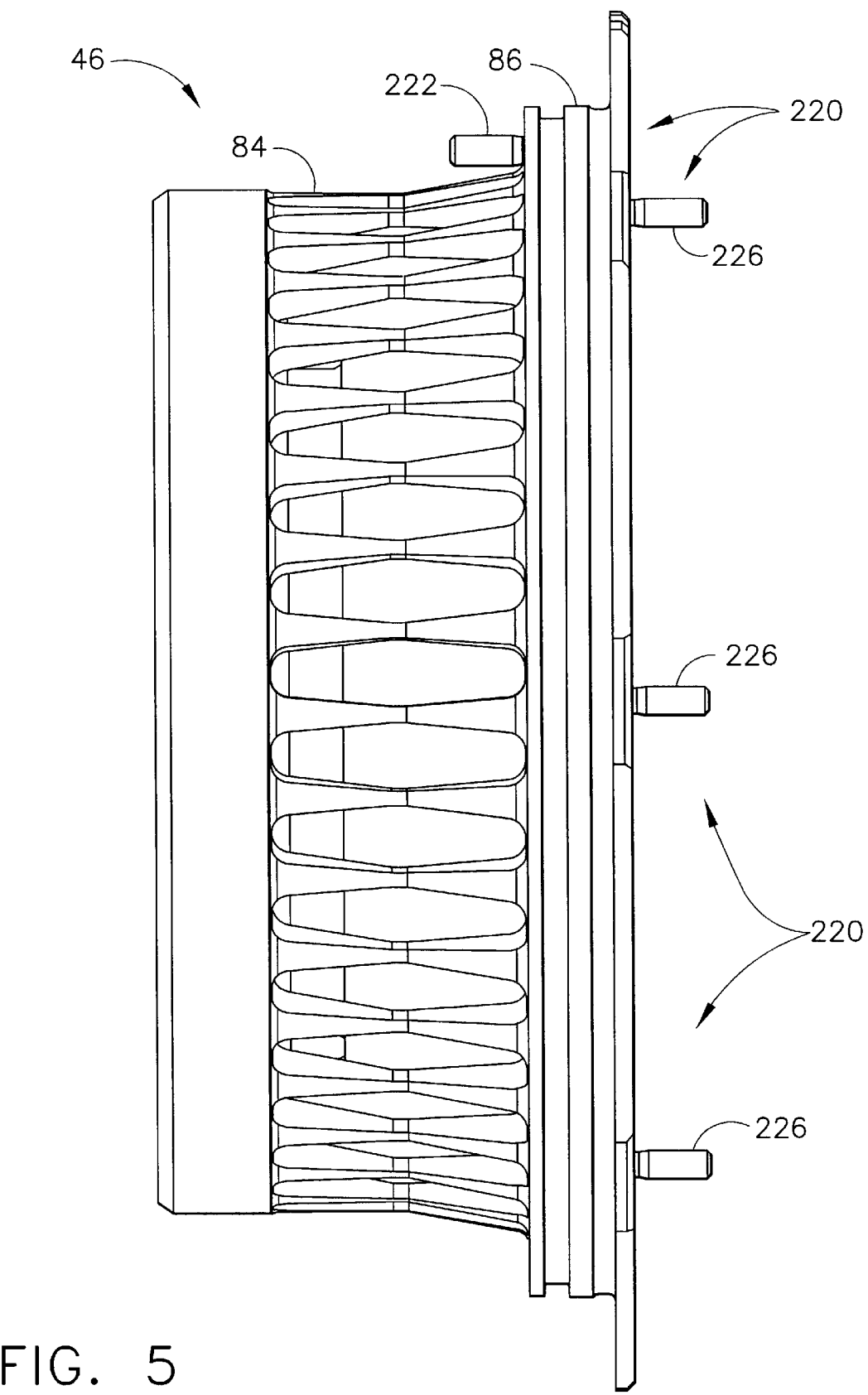
FIG. 5 is an enlarged side view of the bearing assembly shown in FIG. 2.

FIG. 5 is an enlarged side view of bearing assembly 46 including springs 84. Bearing assembly 46 also includes a plurality of attachment points 220. More specifically, a first attachment point 222 extends forward from bearing mounting flange 86 and permits an oil nozzle or oil jet (not shown) to be coupled to bearing assembly 46. A plurality of second attachment points 226 extend afterward from mounting flange 86 to permit a carbon seal to be coupled to bearing assembly 46.

The above-described rotor assembly is cost-effective and highly reliable. The rotor assembly includes a bearing assembly and a damper sub-assembly. The bearing assembly is secured to the sump housing with the plurality of double-tapered springs. The damper sub-assembly facilitates reducing rotor dynamic motion induced to the bearing assembly. Specifically, because the bearing assembly outer race deflects to substantially match a distortion pattern of the damper sub-assembly damper insert, a clearance between the bearing assembly and the damper insert is uniform. Accordingly, damper clearance variation between the bearing assembly and the damper insert is reduced. As a result, the bearing assembly facilitates reducing rotor assembly dynamic motion in a cost-effective and reliable manner.

While the invention has been described in terms of various specific embodiments, those skilled in the art will recognize that the invention can be practiced with modification within the spirit and scope of the claims.

What is claimed is:

1. A method for assembling a gas turbine engine rotor assembly to facilitate reducing dynamic loading of the rotor assembly, the rotor assembly including a rotor shaft, a sump housing, a damper sub-assembly, and a bearing assembly including an inner race, an outer race, a plurality of rolling elements, a plurality of springs, the rolling elements between the inner and outer races, the damper sub-assembly including an annular damper insert, said method comprising the steps of:

supporting the rotor shaft on the mounting frame with the bearing assembly;

coupling the bearing assembly outer race to the sump housing with the plurality of springs; and coupling the damper sub-assembly within the engine such that the bearing assembly outer race deflects during engine operation to substantially match a distortion pattern of the damper insert.

2. A method in accordance with claim 1 wherein the damper sub-assembly damper insert includes an inner diameter and an outer diameter, said step of coupling the damper sub-assembly further comprises the step of coupling the damper sub-assembly to the bearing assembly such that the bearing assembly outer race deflects during engine operation to substantially match a distortion pattern of the damper insert inner diameter.

3. A method in accordance with claim 2 wherein the sump housing has a center, the bearing assembly outer race has a center, said step of coupling the damper sub-assembly further comprising the step of coupling the bearing assembly outer race to the damper sub-assembly such that the rolling elements and the bearing assembly outer race center are offset a radial distance from the sump housing center.

4. A method in accordance with claim 2 further comprising the step of providing an annular bearing assembly outer race that includes at least one surface having a substantially elliptical cross-sectional profile and at least one surface having a substantially circular cross-sectional profile.

5. A method in accordance with claim 2 wherein said step of coupling the bearing assembly outer race to the sump housing further comprises the step of defining a clearance between the bearing assembly and the damper insert.

6. Apparatus for a gas turbine engine rotor, said apparatus comprising:

a bearing assembly comprising an inner race, an outer race, a plurality of rolling elements between said inner and outer races, and configured to support the rotor, and a plurality of springs extending from said outer race to secure said bearing assembly within the gas turbine engine; and a damper sub-assembly configured to dampen dynamic motion of the engine rotor, said damper sub-assembly comprising an annular damper insert, said damper sub-assembly coupled to said bearing assembly outer race such that said bearing assembly outer race configured to deflect during engine operation to substantially match a distortion pattern of said damper insert.

7. Apparatus in accordance with claim 6 wherein said damper insert comprises an inner diameter and an outer diameter, a portion of said damper insert inner diameter in contact with said bearing assembly outer race.

8. Apparatus in accordance with claim 7 further comprising a sump housing adjacent said damper insert outer diameter, said bearing assembly outer race further configured to deflect during engine operation to substantially match a distortion pattern of said damper insert inner diameter.

9. Apparatus in accordance with claim 8 wherein said outer race coupled to said sump housing with said plurality of springs, said sump housing has a center, said bearing assembly outer race has a center, said rolling elements and said outer race center offset a radial distance from said sump housing center.

10. Apparatus in accordance with claim 8 wherein at least one of said bearing assembly inner race and said bearing assembly outer race defines an elliptical cross-sectional profile.

11. Apparatus in accordance with claim 10 wherein said bearing assembly inner race defines a substantially circular cross-sectional profile, said bearing assembly outer race defines an elliptical cross-sectional profile.

12. Apparatus in accordance with claim 11 wherein said bearing assembly outer race coupled to said sump housing with said plurality of springs, said bearing assembly comprising a plurality of attachment points used to mount a seal and an oil jet.

13. A rotor assembly for a gas turbine engine, said rotor assembly comprising:

a rotor shaft;

a bearing assembly configured to support said rotor shaft on a mounting frame such that dynamic motion of said rotor assembly is reduced, said bearing assembly comprising an inner race, an outer race, a plurality of rolling elements, and a plurality of springs, said rolling elements between said inner and outer races; and a damper sub-assembly coupled to said bearing assembly outer race and comprising an annular damper insert, said bearing assembly outer race configured to deflect during engine operation to substantially match a distortion pattern of said damper insert.

14. A rotor assembly in accordance with claim 13 wherein said bearing assembly comprises a plurality of attachment points used to mount a seal and an oil jet.

15. A rotor assembly in accordance with claim 13 wherein said bearing assembly coupled to a sump housing with said plurality of springs, said damper insert comprises an outer diameter and an inner diameter, said damper insert inner diameter adjacent said bearing assembly.

16. A rotor assembly in accordance with claim 13 wherein said damper insert comprises an inner diameter and an outer diameter, said damper housing inner diameter adjacent said bearing assembly bearing outer race, said damper housing outer diameter adjacent a sump housing, said bearing assembly outer race configured to deflect during engine operation to substantially match a distortion pattern of said damper insert inner diameter.

17. A rotor assembly in accordance with claim 16 wherein said sump housing has a center, said bearing assembly outer race has a center, said bearing assembly outer race offset a distance from said sump housing center.

18. A rotor assembly in accordance with claim 16 wherein at least one of said bearing assembly inner race and said bearing assembly outer race defines an elliptical cross-sectional profile.

19. A rotor assembly in accordance with claim 18 wherein said bearing assembly inner race defines a substantially circular cross-sectional profile, said bearing assembly outer race defines an elliptical cross-sectional profile.

20. A rotor assembly in accordance with claim 19 wherein a pre-determined amount of preload force is applied to said bearing assembly rolling elements.

* * * * *